Feb. 25, 1969  W. F. PRAEG  3,430,024
ROTARY WELDING TRANSFORMER
Filed May 4, 1965  Sheet 1 of 2
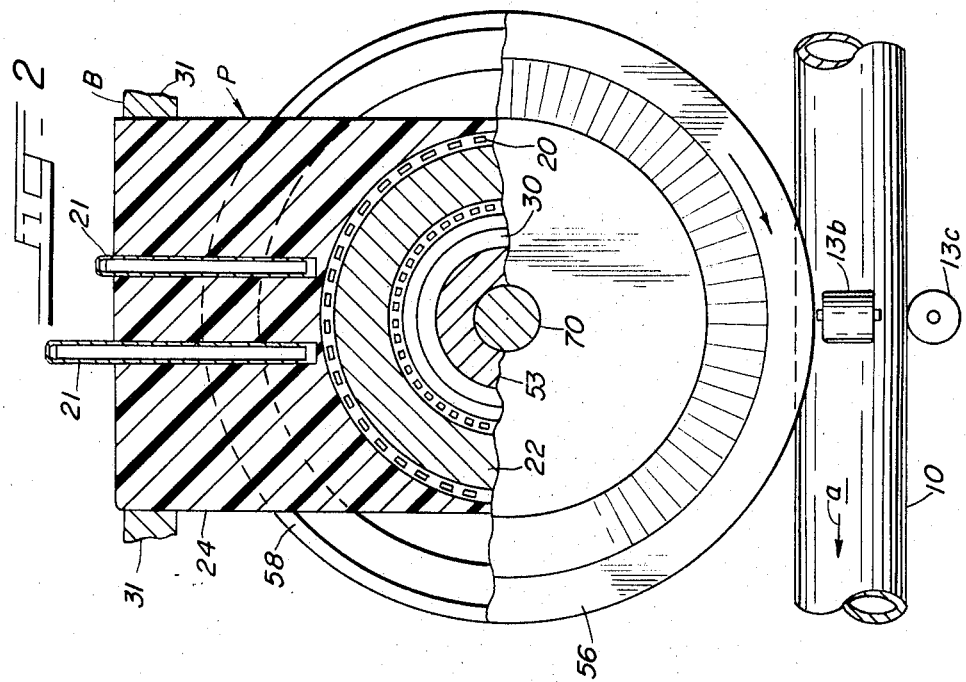
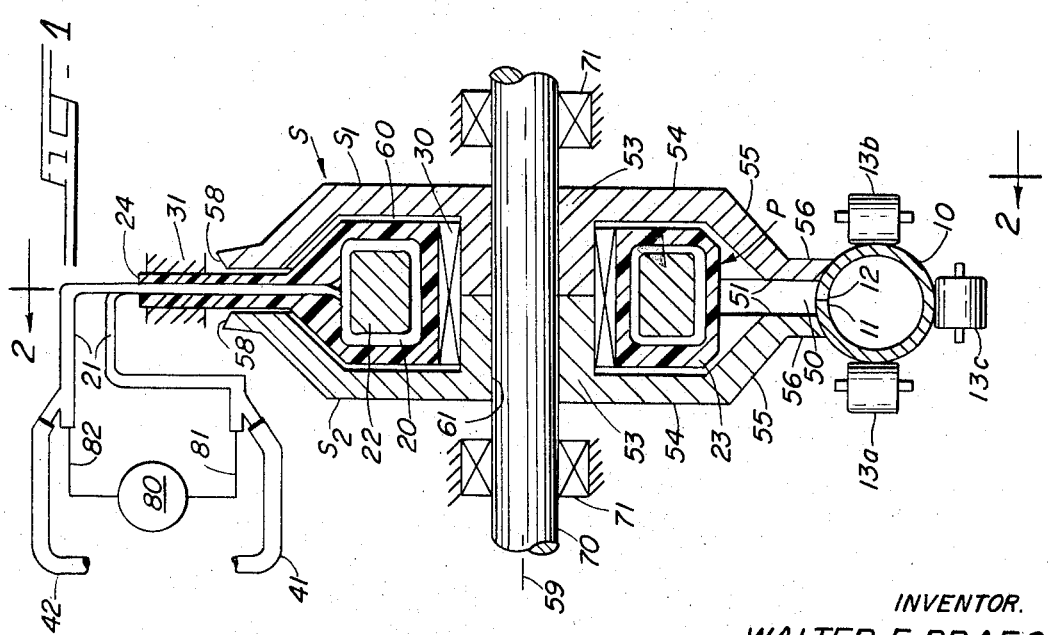
INVENTOR.
WALTER F. PRAEG
BY Morris Spector

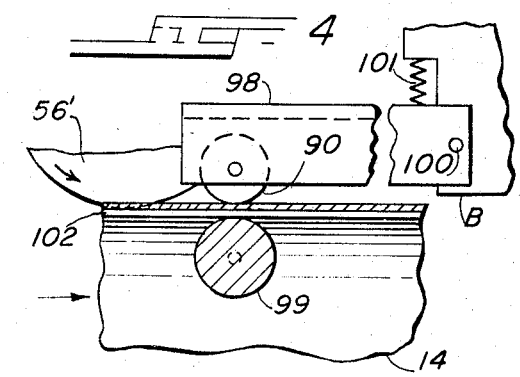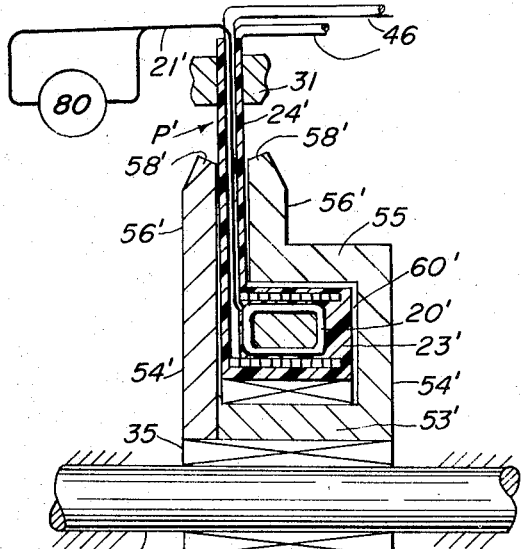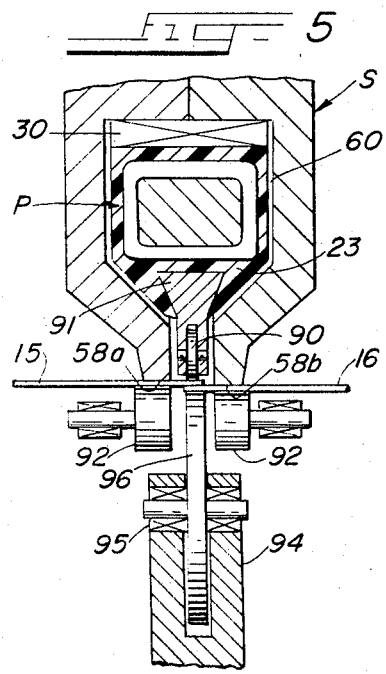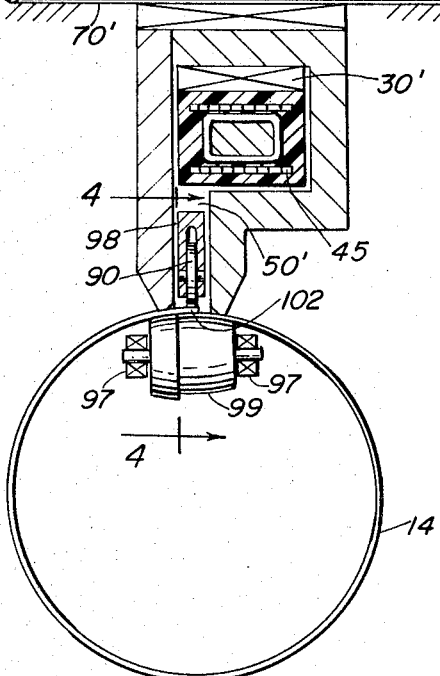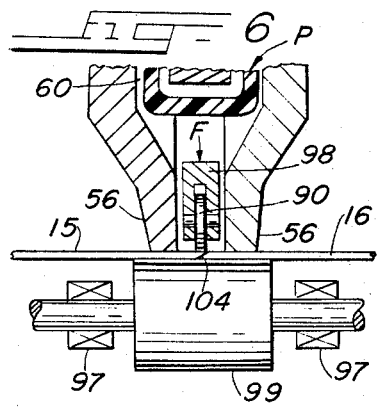

United States Patent Office 3,430,024
Patented Feb. 25, 1969

1

3,430,024
ROTARY WELDING TRANSFORMER
Walter F. Praeg, Palos Park, Ill., assignor to National Can Corporation, Chicago, Ill., a corporation of Delaware
Filed May 4, 1965, Ser. No. 453,162
U.S. Cl. 219—63               7 Claims
Int. Cl. B23k *1/16, 11/30*

ABSTRACT OF THE DISCLOSURE

A welding transformer comprises a stationary toroidal shaped primary housed in a toroidal shaped one-turn rotatable secondary, the peripheral edges of which are spaced electrodes which are surfaces of revolution centered on the axis of rotation of the secondary. To circulate coolant through the transformer, a tube is wrapped around the primary core or the primary winding itself may be tubular. Rollers may be used with the transformer to apply pressure to the heated weld joint independently of the contact pressure of the electrodes.

---

This invention relates to welding apparatus and, more particularly, to improvements in the construction of rotary transformers for resistance welding seams in pipes, tubing, can bodies or sheet metal products.

As is well known in the art, a continuous butt or lap weld of opposed edges of metal is obtained by bringing these edges into electrical contact for purpose of heating these edges to welding temperature by the flow of an electric current through those edges. It is known to provide a rotating transformer for supplying the current to the joint to be welded. The secondary winding is split circumferentially and the split extends radially beyond the outer periphery of the primary. A pair of circumferentially extending welding electrodes that have contact surfaces, one on each side of the split, are adapted to engage the metal to be electrically energized. The whole transformer assembly rotates as the work progresses, and current is supplied to the primary through brushes and slip-rings. Where cooling of the rotating primary is desired, a tube through which fluid is circulated may be wrapped about the primary or core. The tube may be a hollow conductor that constitutes the primary winding. Usually it is necessary to provide special couplings to connect the source of coolant to the rotating primary winding.

It is an object of the present invention to provide welding apparatus which eliminates brushings and slip-rings from the transformer, thereby improving the transformer efficiency and simplifying manufacture, assembly and maintenance.

It is a more specific object of the present invention to provide a transformer of the type stated having a stationary toroidal shaped primary that is housed in a toroidal shaped one-turn rotatable secondary. In accordance with a preferred embodiment of the invention the turn of the secondary constitutes spaced electrodes which are surfaces of revolution centered on the axis about which the secondary rotates. The primary and the magnetic core of the transformer are each preferably surrounded by insulation and also centered on the aforesaid axis of rotation. The unit comprising the insulated stationary primary and core is in a preferred embodiment supported on the rotatable secondary by suitable bearing means.

2

The present invention also simplifies the cooling problem of the transformer. To this end the primary may be a continuous hollow conductor to facilitate the flow of coolant therethrough, or as an alternate the primary structure may have water-cooled means embedded therein or around the same.

It is a further object of the present invention to provide welding apparatus of the type stated in which pressure, by means of cooperating rollers or the like, is applied to the heated weld joint independently of the electrodes, thereby assuring positive pressure on the heated joint regardless of the contact pressure of the electrodes.

The invention may take physical form in certain parts and arrangements of parts, preferred embodiments of which will be described in this specification and illustrated in the accompanying drawings which form a part hereof and wherein:

FIGURE 1 is a cross-sectional view of a toroidal transformer which embodies a preferred embodiment of the invention;

FIGURE 2 is a sectional view taken approximately on the line 2—2 of FIGURE 1;

FIGURE 3 is a view somewhat similar to FIGURE 1 but illustrating another embodiment of this invention;

FIGURE 4 is a fragmentary sectional view taken along line 4—4 of FIGURE 3;

FIGURE 5 is a view similar to the lower portion of FIGURE 1 and illustrating another embodiment of the invention in respect to the arrangement of the pressure rollers for lap-seam welding;

FIGURE 6 is a view similar to FIGURE 4 illustrating the invention as applied to welding of metal portions in an overlapped edge formation.

Referring now to FIGURES 1 and 2, a length of tubular stock 10, having spaced edges 11 and 12 to be welded, is shown as being longitudinally advanced in the direction of the arrow *a* (FIGURE 2) on suitable supporting rollers 13*a*, 13*b*, 13*c* as well as other rollers and equipment, not shown.

The toroidal transformer shown is comprised generally of a stationary primary unit P which is housed in a surrounding one-turn rotating toroidal secondary S, the latter being arranged to energize electrically the work-contact surfaces 58, 58 of electrodes 56, 56, as will appear. These contact surfaces 58 engage the stock 10 and energize the edges 11 and 12 either at the point where they are brought together or preferably in advance thereof to cause a welding current to flow therebetween.

The unit P has a torodial shaped primary winding 20 of a hollow conductor with terminal leads 21, 21 extending outwardly of the secondary through the space 50 between the electrodes 56, 56 for connection to cooling fluid supply lines 41 and 42 and to the power source 80. The primary unit also includes a torodial shaped magnetically permeable core 22 of any known or desired construction, either of laminated materials or of powdered materials depending upon the frequency of operation. The primary core 22 and winding 20 are centered on the axis 59 and are embedded in rigid electrically insulating material 23 of suitable mechanical strength, e.g. fiberglass, phenolic resin, etc. The unit P is supported by a bearing 30 and prevented from rotation by suitable means such as stops 31, or 31 which engage opposite sides of the part 24 of the insulation that extends outwardly of the secondary between the electrodes 56, 56. The stops may be mounted to the base B of the machine or the other non-rotating structures.

The secondary S completely surrounds and encloses the primary winding 20 and core 22 with the exception of the space 50 defined between the surfaces 51 which, in the embodiment of FIGURE 1, are in axially facing relationship. Obviously these surfaces may face otherwise and may extend at an angle relative to the radial plane through the transformer.

The secondary is comprised of two sections $S_1$–$S_2$ which are secured together. Each section has a circumferentially extending axial portion 54, a radically circumferentially extending slanted portion 55, and radially outer circumferentially extending electrode-forming disc portion 56. The sections $S_1$–$S_2$, are in electrically conductive relationship. They may be fastened together, by brazing, passing bolts axially through the portions 53, or otherwise.

The work-contact surfaces 58 are surfaces of revolution which are electrically conductive throughout 360 degrees. The surfaces 58 are, furthermore, centered on the axis 59.

The secondary portions 53 support a bearing 30 and the portions 53 are separated from the unit P by the radial thickness of bearing 30. All other portions of the secondary S are separated from the Unit P by air gaps 60.

The transformer secondary is mounted for rotation about the axis 59 by a shaft 70 extending through the central opening 61 defined by the portions 53. The outer diameter of shaft 70 is generally equal to the inner diameter of portions 53, and the sections $S_1$, $S_2$ are rigidly secured to the shaft 70 by press-fitting, keying or other suitable manner. The shaft 70 is rotatably supported in bearings 71 which are, in turn, supported on the base of the machine. It will be noted that secondary portions 53 abut in the radial plane through the space 50, and thus any radial forces which are substantially between tube 10 and the transformer secondary S are transmitted directly to the shaft 70. These forces are then transmitted through the shaft to bearings 71 and, in turn, transmitted to the base of the machine. Obviously bearings 71 may be adjustably mounted relative to the machine in order that various sizes of tube 10 may be accomodated and in order that the pressure between contact surfaces 58 and the tube 10 may be adjusted. Alternately, suitable means may be provided for adjusting the vertical height of the tube 10 relative to the transformer.

It will be noted that the bearings 71 are located axially beyond the planes of portions 54. Obviously, if the shaft 70 is of sufficient strength, it need only be supported at one axial end by one or more bearings. It will also be appreciated that the transformer secondary S might rotate simply because of the contact pressure between surfaces 58 and the tube 10. Alternately, power-driven means may be provided for rotating the transformer secondary S through the shaft 70, as is conventional in the art.

Alternating current flowing in the winding 20 will, by transformer action, generate an alternating voltage in the secondary S, which voltage appears across the split 50 and is conducted to the surfaces 58 through the pair of electrodes 56.

The conductor from which winding 20 and the external leads 21 are made may be hollow in order that cooling fluid may be circulated through it to remove heat generated in coil 20 and core 22. Cooling fluid, e.g. oil, water, etc., is carried to leads 21 by intake line 41 and removed by out let line 42. Both lines 41 and 42 are made from electrically insulating material, e.g. rubber hose, and connects to leads 21 before these leads are electrically connected to the conductors 81 and 82 of the power source 80.

Various means may be employed to remove heat generated within the rotating secondary as is conventional within the art. For example, a flow of air may be directed against the secondary by one or more air nozzles adjacent thereto. Also, the portions 54, 55, may be perforated in a number of places to facilitate flow of cooling air through the secondary.

FIGURE 3 shows an alternative embodiment of the invention. There the hollow portion 53′ of the secondary S′ has a disc portion 54′ rigidly secured to one axial end thereof. The portions 53′, 54′, have electrodes 56′ with circumferentially extending annular contact surfaces 58′ which are similar to the contact surfaces 58. The disc portion 54′, outer portion 55′ and electrode portion 56′ with its contact surface are somewhat similar in construction to that shown in FIGURE 1. However, in this embodiment of the invention the transformer secondary S is mounted for rotation about the axis of a stationary shaft 70 that is secured to the base of the machine. The shaft 70 extends through the central opening 61′ of the toroid and in a bearing 35 journals the secondary S on the fixed shaft 70′.

Secondary portion 53′ supports unit P′ through a bearing 30′. The unit P′ has a multi-turn toroidal coil 20′ wound with a solid conductor having terminal leads 21′ extending externally through the space between the electrodes 56′, 56′ to the power source 80. The radially inner and outer boundaries of the insulated primary coil 20′ are surrounded by layers of copper tubing 45 extending externally of the transformer through the space 50′ to a source of cooling fluid by means of tubes 46, 46 to remove the heat generated within the primary circuit. Copper tubing 45 is arranged such that the layers do not enclose the magnetic flux of core 22′. The primary coil 20′, core 22′ and the layers of cooling tubing are embedded and supported by solid electrically insulating material 23′, a portion 24′ of which projects outwardly through the space between the electrodes 56′, 56′. Air gaps 60′ separate the unit P′ from the secondary S and stops 31 prevent the unit P′ from rotating.

In this embodiment of the invention, it will be noted that the transformer, together with other parts of the apparatus, is used to produce a lap seam weld, and that the secondary rotates because of the contact pressure that is continuously maintained between surfaces of revolution 58′ and the material to be welded. A length of preformed sheet metal tubing 14, for example a can body, is supported and longitudinally advanced by suitable means, not shown. The edges of tubing 14 are overlapped at a longitudinal seam 102 at the gap 50′ which separates the contact surfaces 58′ of the transformer secondary. Welding current is conducted on the left and right hand side of the overlapping edges of tubing 14 by pressing the contact surfaces 58′ against the tubing 14. The tubing is supported by a rigid nonmetallic roller 99 which is, in turn, supported by bearings 97, 97. Centered within gap 50′ of the transformer secondary is a pressure roller 90 rotatably supported by pressure lever 98. The lever 98 can move freely up and down within gap 50′ and is pivotally supported at 100 on the base of the machine. A downward force is applied to lever 98 by an electromagnet 101 or suitable spring. This presses roller 90 against the overlapped ends 102 of tubing 14 which, in turn, presses those overlapped edges 102 together and against support roller 99 along a narrow band which forms a path of relative high conductivity and through which most of the current will pass, thereby heating the metal to welding temperature.

The lines of contact of the pressure rollers 90, 99 with the overlapped edges may be approximately in the plane that passes through the axes of rotation of the electrodes 56′, 56′. However, it is preferable that the axes of rotation of the rollers 90, 99 be to the right of axis of rotation of the electrodes 56′, 56′, reference being made to FIGURE 4 wherein the tube 14 is being advanced to the right. In this way the overlapped edges 102 between the lines of contact with the pressure rollers 90, 99 will be preheated by welding current prior to pressure being applied by the rollers 90, 99.

FIGURE 5 shows still a further alternative embodiment of the invention for lapped seam welding. The construction of the transformer is somewhat similar to those shown in FIGURES 1 and 3. A stationary unit P is supported by bearing 30 and enclosed by a one-turn rotating toroidal secondary S which is axially separated from the primary by air gaps 60. The electrodes of the toroidal secondary S are pressed against the overlapped pieces of sheet metal 15, 16 to be welded together and rotated because of the pressure between the annular contact surfaces 58a of the electrodes and the pieces 15, 16. Alternately, power-driven means might be provided for rotating the secondary S. The pieces 15 and 16 are supported by rollers 92 which are, in turn, supported by bearings 93, and other suitable means, not shown. The edges of pieces 15 and 16 are overlapped at gap 50.

Pressure wheel 90 is supported by a structure 91 which is rigidly carried by the stationary insulation 23 of unit P. Pressure wheel 96 is supported by bearings 95, in turn supported by structure 94. A suitable force F is exerted by a spring or other device may be applied to the structure 94 to press the roller 96 against the overlapped pieces 15, 16. The wheels 90 and 96 are centered with respect to the gap 50 and cooperate to press the heated overlapped edges of the pieces 15, 16 together. The wheels 90, 96 engage pieces 15 and 16 on an imaginary line drawn between the lines of contact of said pieces with the contact surfaces 58a, 58a or may engage pieces 15 and 16 ahead such imaginary line, as in FIGURE 4.

FIGURE 6 illustrates still another embodiment of the invention. A rigid nonmetallic roller 99', supported by bearings 97, is used to support pieces 15 and 16 in order that their overlapped slanted edges 104 may be welded. The transformer primary unit P and secondary S are much similar to the ones of FIGURE 1 and are thus separated by air gaps 60. Weld pressure wheel 90 and its lever 98 are much similar to the ones of FIGURE 3.

In compliance with the requirements of the patent statutes, I have herein shown and described a preferred embodiment of the present invention. It is, however, to be understood that the invention is not limited to the precise construction herein shown, the same being merely illustrative of the principles of the invention.

What is new and considered to be secured by Letters Patent is:

1. A welding transformer having a one-turn toroidal shaped secondary having axially spaced electrodes at its outer periphery, the surfaces of said electrodes being electrically conductive surfaces of revolution extending 360 degrees and being centered on a common axis, means for journalling said secondary for rotation about said common axis, a toroidal shaped magnetically permeable core housed entirely within said secondary and being coaxial with said common axis, a toroidal shaped primary wound around said core and having lead conductors extending radially outwardly of said secondary through the space between said electrodes, for connection to a source of current, insulation encasing the primary and core to the portions of the lead conductors that extend through said space between the electrodes, there being a gap between the insulation and secondary, bearing means for supporting on the secondary a unit comprising the core, primary and insulation, means for preventing rotation of said unit upon rotation of the secondary, and means by which fluid may be circulated through the unit to facilitate cooling of same, the last named means including a tubular primary winding.

2. A welding transformer having a one-turn toroidal shaped secondary having axially spaced electrodes at its outer periphery, the surfaces of said electrodes being electrically conductive surfaces of revolution extending 360 degrees and being centered on a common axis, means for journalling said secondary for rotation about said common axis, a toroidal shaped magnetically permeable core housed entirely within said secondary and being coaxial with said common axis, a toroidal shaped primary wound around said core and having lead conductors extending radially outwardly of said secondary through the space between said electrodes, for connection to a source of current, insulation encasing the primary and core and the portions of the lead conductors that extend through said space between the electrodes, there being a gap between the insulation and secondary, bearing means for supporting on the secondary a unit comprising the core, primary and insulation, means for preventing rotation of said unit upon rotation of the secondary, and means by which fluid may be circulated through the unit to facilitate cooling of same, the last-named means being a tube wrapped around the core adjacent to the primary.

3. A transformer having a hollow toroidal shaped secondary having annular axially spaced electrodes at its outer periphery, the work-engaging surfaces of said electrodes being centered on a common axis, means for supporting said secondary for rotation about said common axis, said transformer having a toroidal shaped magnetically permeable core housed entirely within said secondary and a toroidal primary wound around said core, said core being coaxial with said common axis, the primary having lead conductors extending radially outwardly of said secondary through the space between said electrodes for connection to a source of current, bearing means supporting the core and primary on said secondary, and means for preventing rotation of the primary and core upon rotation of the secondary, in combination with a wheel located in the axial spaced between said electrodes for applying pressure to a weld joint, and means for mounting said wheel on said primary.

4. A transformer having a hollow toroidal shaped secondary having annular axially spaced electrodes at its outer periphery, the work-engaging surfaces of said electrodes being centered on a common axis, means for supporting said secondary for rotation about said common axis, said transformer having a toroidal shaped magnetically permeable core housed entirely within said secondary and a toroidal primary wound around said core, said core being coaxial with said common axis, the primary having lead conductors extending radially outwardly of said secondary through the space between said electrodes for connection to a source of current, bearing means supporting the core and primary on said secondary, and means for preventing rotation of the primary and core upon rotation of the secondary, in combination with a wheel for applying pressure to a weld joint, and means for mounting said wheel for application of pressure to the weld joint independently of the pressure applied by the electrodes to the work.

5. A welding transformer having a one turn toroidal shaped secondary having axially spaced electrodes at its outer periphery, for engagement with the work to be welded, the work-engaging surfaces of said electrodes being electrically conductive surfaces of revolution extending 360 degrees and being centered on a common axis, means for journalling said secondary for rotation about said common axis, a toroidal shaped magnetically permeable core housed entirely within said secondary and being coaxial with said common axis, a toroidal shaped primary wound around said core and having lead conductors extending radially outwardly of said secondary through the space between said electrodes for connection to a soucre of current, insulation encasing the primary and core and the portions of the lead conductors that extend through said space between the electrodes, there being a gap between the insulation and secondary, bearing means for supporting on the secondary a unit comprising the core, primary and insulation, means for preventing rotation of said unit upon rotation of the secondary, and cooperating rollers for applying pressure to the welded joint of the work independently of said electrodes.

6. Apparatus according to claim 5 in which at least one roller is between the electrodes and is rigidly supported by said unit.

7. Apparatus according to claim 5 in which the pressure rollers are applied to succesive portions of the weld joint after contact of each successive portion with the electrodes.

References Cited

UNITED STATES PATENTS

| 2,993,109 | 7/1961 | Tudbory | 219—63 |
| 1,199,537 | 9/1916 | Fulda | 21—63 |

FOREIGN PATENTS

| 265,411 | 6/1929 | Italy. |

RICHARD M. WOOD, *Primary Examiner.*

B. A. STEIN, *Assistant Examiner.*